(12) United States Patent
Zhou et al.

(10) Patent No.: US 11,374,286 B2
(45) Date of Patent: Jun. 28, 2022

(54) SEPARATOR AND ELECTROCHEMICAL DEVICE

(71) Applicant: Ningde Amperex Technology Limited, Fujian (CN)

(72) Inventors: Xinhui Zhou, Fujian (CN); Xiaofeng Zhang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 86 days.

(21) Appl. No.: 16/407,211

(22) Filed: May 9, 2019

(65) Prior Publication Data

US 2020/0303707 A1 Sep. 24, 2020

(30) Foreign Application Priority Data

Mar. 18, 2019 (CN) .......................... 201910205297.8

(51) Int. Cl.
*H01M 10/0525* (2010.01)
*H01M 50/449* (2021.01)
(Continued)

(52) U.S. Cl.
CPC ..... *H01M 50/449* (2021.01); *H01M 10/0525* (2013.01); *H01M 10/0587* (2013.01); *H01M 50/431* (2021.01); *H01M 50/446* (2021.01)

(58) Field of Classification Search
CPC .. H01M 2/1686; H01M 2/1646; H01M 2/166; H01M 10/0525; H01M 10/0587;
(Continued)

(56) References Cited

U.S. PATENT DOCUMENTS

| 2001/0005560 A1* | 6/2001 | Yoshida | H01M 2/16 429/144 |
| 2008/0118827 A1 | 5/2008 | Call et al. | |

(Continued)

FOREIGN PATENT DOCUMENTS

| CN | 202333014 | 11/2012 |
| CN | 103493253 | 1/2014 |

(Continued)

OTHER PUBLICATIONS

Fedelich, Nicolas; "Application Handbook Thermal Analysis of Polymers Selected Applications Thermal Analysis", located at <https://www.mt.com/dam/LabDiv/guides-glen/ta-polymer/TA_Polymers_Selected_Apps_EN.pdf, dated Feb. 1, 2013, 40 pgs.

(Continued)

*Primary Examiner* — Olatunji A Godo
(74) *Attorney, Agent, or Firm* — Taylor English Duma LLP (57) ABSTRACT

The present application provides a separator comprising a first porous substrate, a second porous substrate and a first coating layer including a substance that reversibly intercalates and deintercalates lithium and a first inorganic particle, and an electrochemical device, wherein the first coating layer is disposed between the first porous substrate and the second porous substrate. By disposing the first coating layer between the first porous substrate and the second porous substrate, the present application improves the safety performance, rate performance and cycle performance of the electrochemical device.

19 Claims, 1 Drawing Sheet

(51) Int. Cl.
*H01M 10/0587* (2010.01)
*H01M 50/431* (2021.01)
*H01M 50/446* (2021.01)

(58) Field of Classification Search
CPC . H01M 50/449; H01M 50/446; H01M 50/431
See application file for complete search history.

(56) References Cited

U.S. PATENT DOCUMENTS

| | | | |
|---|---|---|---|
| 2009/0092900 A1* | 4/2009 | Obana | H01M 4/0404 429/223 |
| 2009/0291355 A1 | 11/2009 | Baba et al. | |
| 2010/0136410 A1 | 6/2010 | Kawasoe et al. | |
| 2012/0301698 A1 | 11/2012 | Rhee et al. | |
| 2013/0216891 A1 | 8/2013 | Byun et al. | |
| 2013/0236765 A1 | 9/2013 | Amperex et al. | |
| 2014/0079980 A1 | 3/2014 | Halmo et al. | |
| 2014/0141314 A1 | 5/2014 | Kaneda et al. | |
| 2014/0272533 A1 | 9/2014 | Shi et al. | |
| 2014/0322586 A1 | 10/2014 | Lee et al. | |
| 2014/0329120 A1* | 11/2014 | Cui | H01M 50/449 429/90 |
| 2015/0132643 A1 | 5/2015 | Sasaki | |
| 2015/0263324 A1 | 9/2015 | Lee et al. | |
| 2016/0013463 A1* | 1/2016 | Roumi | H01M 10/052 429/145 |
| 2016/0141576 A1 | 5/2016 | Lee et al. | |
| 2017/0033346 A1 | 2/2017 | Zhang et al. | |
| 2017/0187063 A1* | 6/2017 | Pistorino | H01M 10/0525 |
| 2019/0131604 A1 | 5/2019 | Yoon et al. | |
| 2019/0319245 A1 | 10/2019 | Xiao et al. | |

FOREIGN PATENT DOCUMENTS

| | | | |
|---|---|---|---|
| CN | 203631635 | | 6/2014 |
| CN | 104103791 | | 10/2014 |
| CN | 104205415 | | 12/2014 |
| CN | 104377328 | | 2/2015 |
| CN | 106981607 | | 7/2017 |
| CN | 108389999 | | 8/2018 |
| CN | 108448160 | A | 8/2018 |
| CN | 108475815 | | 8/2018 |
| CN | 110364662 | | 10/2019 |
| EP | 0924780 | * | 7/2001 |
| EP | 2838137 | | 2/2015 |
| EP | 3712983 | | 9/2020 |
| EP | 3736880 | | 11/2020 |
| WO | 2018217990 | | 11/2018 |

OTHER PUBLICATIONS

Xiao, Liangzhen; Advisory Action for U.S. Appl. No. 16/174,385, filed Oct. 30, 2018, dated Oct. 8, 2020, 5 pgs.
Xiao, Liangzhen; European Search Report for Application No. 19173617.2, filed May 9, 2019, dated Jun. 26, 2019, 8 pgs.
Xiao, Liangzhen; Final Office Action for U.S. Appl. No. 16/174,385, filed Oct. 30, 2018, dated Jul. 31, 2020, 13 pgs.
Xiao, Liangzhen; Non Final Office Action for U.S. Appl. No. 16/174,385, filed Oct. 30, 2018, dated Apr. 28, 2020, 13 pgs.
Xiao, Liangzhen; Non-Final Office Action for U.S. Appl. No. 16/174,385, filed Oct. 30, 2018, dated Nov. 2, 2020, 14 pgs.
Zhou, Xinhui; European Search Report for Application No. 19186637.5, filed Jul. 16, 2019, dated Feb. 17, 2020, 8 pgs.
Xiao, Liangzhen; Office Action for European Application No. 19173617.2, filed May 9, 2019, dated May 15, 2020, 8 pgs.
Zhou, Xinhui; Chinese Office Action for Application No. 2019102052978, filed Mar. 18, 2019, dated Jan. 24, 2022, 18 pgs.
Kalnaus et al., "Mechanical behavior and failure mechanisms of Li-ion battery separators," J. Power Sources, vol. 348, Apr. 30, 2017, pp. 255-263 (Year: 2017).
Xiao, Liangzhen; Advisory Action for U.S. Appl. No. 16/174,385, filed Oct. 30, 2018, dated Apr. 7, 2021, 4 pgs.
Xiao, Liangzhen; Final Office Action for U.S. Appl. No. 16/174,385, filed Oct. 30, 2018, dated Feb. 19, 2021, 33 pgs.
Zhou, Xinhui; Chinese Office Action for Application No. 201910205297.8, filed Mar. 18, 2019, dated Jul. 1, 2021, 31 pages.

* cited by examiner

SEPARATOR AND ELECTROCHEMICAL DEVICE

PRIORITY CLAIM AND CROSS-REFERENCE

This application claims priority to and benefits of Chinese Patent Application Serial No. 201910205297.8 filed with China National Intellectual Property Administration on Mar. 18, 2019, and the entire content of which is incorporated herein by reference.

FIELD OF THE APPLICATION

The present application relates to the field of electrochemical devices, in particular, to a separator and an electrochemical device.

BACKGROUND OF THE APPLICATION

At present, the application of electrochemical devices (such as lithium ion batteries) is more and more popular, and the conditions and environment for use are becoming more and more complicated. For example, charging and discharging under high-rate conditions, used in a low-temperature environment, and cycle life should be further improved, etc. Under these conditions and circumstances, improper use or mishandling will lead to lithium precipitation in the negative electrode of the electrochemical device to produce lithium dendrites. Moreover, in the cycle process of the electrochemical device, due to the influence of its own polarization, the probability of lithium dendrite generated by the lithium precipitation in the negative electrode in the middle and late lifespan is increasing. As a result, the risk of internal short circuit of the electrochemical device is significantly increased, resulting in a very large safety hazard. Therefore, there is an urgent need for a technical means to reduce the safety risk of lithium dendrites generated by lithium precipitation in the negative electrode during the entire lifetime of the electrochemical device.

SUMMARY OF THE APPLICATION

The example of the present application provides a separator, which is used to solve the safety problems caused by the rapid growth of lithium dendrites (e.g., problems for the electrochemical device caused by the generation of lithium dendrites due to polarization of electrochemical devices after charge and discharge at high rates, charge and discharge at low temperatures, and multiple cycles) so as to improve the safety performance, rate performance, performance at low temperature and cycle performance of the electrochemical device.

The present application provide a separator, comprising: a first porous substrate; a second porous substrate; and a first coating layer including a substance that reversibly intercalates and deintercalates lithium, and a first inorganic particle; wherein the first coating layer is disposed between the first porous substrate and the second porous substrate.

In the above separator, wherein the substance that reversibly intercalates and deintercalates lithium is selected from one or more of artificial graphite, natural graphite, mesocarbon microbeads, soft carbon, hard carbon, silicon, tin, silicon oxide, silicon carbon composites, titanium-niobium oxide, lithium titanate.

In the above separator, wherein the first porous substrate has a thickness of 0.5 μm to 50 μm; the second porous substrate has a thickness of 0.5 μm to 50 μm; the first coating layer has a thickness of 0.05 μm to 10 μm.

In the above separator, wherein the first coating layer further includes a binder, and the binder is selected from one or more of vinyl fluoride-hexafluoropropylene copolymer, vinylidene fluoride-trichloroethylene copolymer, polystyrene, polyacrylate, polyacrylic acid, polyacrylic acid salt, polyacrylonitrile, polyvinylpyrrolidone, polyvinyl acetate, ethylene-vinyl acetate copolymer, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, carboxymethyl cellulose, sodium carboxymethyl cellulose, lithium carboxymethyl cellulose, acrylonitrile-styrene-butadiene copolymer, polyphthalaldehyde phenyl diamine, polyvinyl alcohol, styrene-butadiene copolymer and polyvinylidene fluoride.

In the above separator, wherein the polyacrylate includes one or more of poly (methyl methacrylate), poly (ethyl acrylate), poly (propyl acrylate) and poly (butyl acrylate).

In the above separator, wherein at least one of a surface of the first porous substrate remote from the first coating layer and a surface of the second porous substrate remote from the first coating layer includes a second coating layer, and the second coating layer includes one or both of a second inorganic particle and a polymer.

In the above separator, wherein the first inorganic particle is selected from at least one of a) an inorganic particle having a dielectric constant of 5 or more, b) an inorganic particle with piezoelectricity and c) an inorganic particle with lithium ion conductivity.

In the above separator, wherein the inorganic particle having a dielectric constant of 5 or more is selected from one or more of $SrTiO_3$, $SnO_2$, $CeO_2$, MgO, NiO, CaO, ZnO, $ZrO_2$, $Y_2O_3$, $Al_2O_3$, $TiO_2$, boehmite, magnesium hydroxide and SiC.

In the above separator, wherein the inorganic particle with piezoelectric property is selected from one or more of $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT) and cerium oxide ($HfO_2$).

In the above separator, wherein the inorganic particle with lithium ion conductivity is selected from at least one of: lithium phosphate ($Li_3PO_4$); lithium titanium phosphate $Li_xTi_y(PO_4)_3$, wherein $0<x<2$, $0<y<3$; lithium aluminum titanium phosphate ($Li_xAl_yTi_z(PO_4)_3$), wherein $0<x<2$, $0<y<1$, $0<z<3$; (LiAlTiP)$_xO_y$-type glass, wherein $0<x<4$, $0<y<13$; lithium lanthanum titanate ($Li_xLa_yTiO_3$), wherein $0<x<2$, $0<y<3$; lithium germanium thiophosphate ($Li_xGe_yP_zS_w$), wherein $0<x<4$, $0<y<1$, $0<z<1$, $0<w<5$; lithium nitride ($Li_xN_y$), wherein $0<x<4$, $0<y<2$; $SiS_2$-type glass ($Li_xSi_yS_z$), wherein $0<x<3$, $0<y<2$, $0<z<4$; and $P_2S_5$-type glass ($Li_xP_yS_z$), wherein $0<x<3$, $0<y<3$, $0<z<7$.

In the above separator, wherein the first inorganic particle has an average particle diameter (Dv50) of 0.001 μm to 15 μm, the average particle diameter (Dv50) means that the inorganic particle reach 50% of the cumulative volume from the side of small particle size in the granularity distribution on a volume basis.

In the above separator, wherein the second inorganic particle has an average particle diameter (Dv50) of 0.001 μm to 15 μm.

In the above separator, wherein the mass ratio of the first inorganic particle to the substance that reversibly intercalates and deintercalates lithium is 0.1 to 16.

In the above separator, wherein the second coating layer includes a second inorganic particle and a polymer, and the weight percentage of the second inorganic particles is from 40% to 99% based on total weight of the second coating layer.

In the above separator, wherein the polymer is selected from one or more of vinyl fluoride-hexafluoropropylene copolymer, vinylidene fluoride-trichloroethylene copolymer, polystyrene, polyacrylate, polyacrylic acid, polyacrylic acid salt, polyacrylonitrile, polyvinylpyrrolidone, polyvinyl acetate, ethylene-vinyl acetate copolymer, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, carboxymethyl cellulose, sodium carboxymethyl cellulose, lithium carboxymethyl cellulose, acrylonitrile-styrene-butadiene copolymer, polyphthalaldehyde phenyl diamine, polyvinyl alcohol, styrene-butadiene copolymer and polyvinylidene fluoride.

In the above separator, wherein the polyacrylate includes one or more of poly (methyl methacrylate), poly (ethyl acrylate), poly (propyl acrylate) and poly (butyl acrylate).

In the above separator, wherein the first porous substrate and the second porous substrate are a polymer film, a multilayer polymer film, or a nonwoven fabric formed by any one or more of polyethylene, polypropylene, polyethylene terephthalate, polyphthalaldehyde phenyl diamine, polybutylene terephthalate, polyester, polyacetal, polyamide, polycarbonate, polyimide, polyetheretherketone, polyaryletherketone, polyetherimide, polyamideimide, polybenzimidazole, polyethersulfone, polyphenylene ether, cyclic olefin copolymer, polyphenylene sulfide and polyethylene naphthalene, wherein the polyethylene is selected from at least one component of high-density polyethylene, low-density polyethylene, and ultra-high-molecular-weight polyethylene.

In the above separator, wherein the first porous substrate and the second porous substrate have an average pore diameter of 0.001 μm to 10 μm, and the first porous substrate and the second porous substrate have a porosity of 5% to 95%.

In the above separator, wherein the second inorganic particle is selected from at least one of a) an inorganic particle having a dielectric constant of 5 or more, b) an inorganic particle with piezoelectricity and c) an inorganic particle with lithium ion conductivity.

In the above separator, wherein the inorganic particle having a dielectric constant of 5 or more is selected from one or more of $SrTiO_3$, $SnO_2$, $CeO_2$, MgO, NiO, CaO, ZnO, $ZrO_2$, $Y_2O_3$, $Al_2O_3$, $TiO_2$, boehmite, magnesium hydroxide and SiC.

In the above separator, wherein the inorganic particle with piezoelectric property is selected from one or more of $BaTiO_3$, $Pb(Zr,Ti)O_3$(PZT), $Pb_{1-x}La_xZr_{1-y}Ti_yO_3$ (PLZT), $Pb(Mg_{1/3}Nb_{2/3})O_3$—$PbTiO_3$ (PMN-PT) and cerium oxide ($HfO_2$).

In the above separator, wherein the inorganic particle with lithium ion conductivity is selected from at least one of: lithium phosphate ($Li_3PO_4$); lithium titanium phosphate $Li_xTi_y(PO_4)_3$, wherein 0<x<2, 0<y<3; lithium aluminum titanium phosphate ($Li_xAl_yTi_z(PO_4)_3$), wherein 0<x<2, 0<y<1, 0<z<3; $(LiAlTiP)_xO_y$-type glass, wherein 0<x<4, 0<y<13; lithium lanthanum titanate ($Li_xLa_yTiO_3$), wherein 0<x<2, 0<y<3; lithium germanium thiophosphate ($Li_xGe_y$-$P_zS_w$), wherein 0<x<4, 0<y<1, 0<z<1, 0<w<5; lithium nitride ($Li_xN_y$), wherein 0<x<4, 0<y<2; $SiS_2$-type glass ($Li_xSi_yS_z$), wherein 0<x<3, 0<y<2, 0<z<4; and $P_2S_5$-type glass ($Li_xP_yS_z$), wherein 0<x<3, 0<y<3, 0<z<7.

The present application further provide an electrochemical device, comprising: a positive electrode; a negative electrode; and a separator, the separator comprising: a first porous substrate; a second porous substrate; and a first coating layer including a substance that reversibly intercalates and deintercalates lithium, and a first inorganic particle; wherein the first coating layer is disposed between the first porous substrate and the second porous substrate.

In the above electrochemical device, wherein the electrochemical device is a lithium ion battery and the lithium ion battery includes an electrode assembly, the electrode assembly being of a wound type.

By disposing the first coating layer including a substance that reversibly intercalates and deintercalates lithium, and a first inorganic particle between the first porous substrate and the second porous substrate, the present application may significantly improve the safety performance, rate performance, performance at low temperature and cycle performance of the electrochemical device.

DETAILED DESCRIPTION OF THE EXAMPLES

The exemplary examples are described in sufficient detail below, but these exemplary examples may be implemented in various ways and should not be construed as being limited to the examples set forth herein. Rather, these examples are provided so that the present application will be thorough and complete and the scope of the present application is fully conveyed to those skilled in the art.

Figure 1:
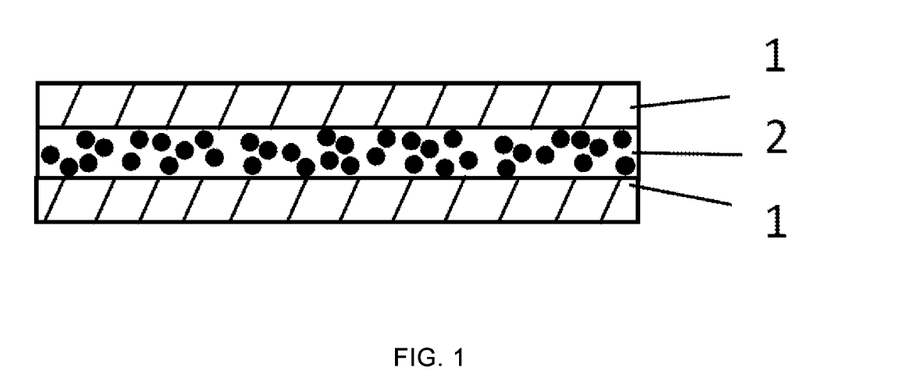
FIG. 1 shows a schematic view of the separator according to some examples of the present application.

FIG. 1 shows a schematic view of the separator according to some examples of the present application. As shown in FIG. 1, the separator of the present application comprises porous substrates 1 and a first coating layer 2 disposed between the porous substrates 1. In the present application, the porous substrates 1 located on both sides of the first coating layer 2 may be referred to as a first porous substrate and a second porous substrate, respectively, and the first porous substrate and the second porous substrate may be used interchangeably.

The first coating layer 2 includes a substance that reversibly intercalates and deintercalates lithium, and a first inorganic particle, which are mixed uniformly, so that on the one hand, the substance that reversibly intercalates and deintercalates lithium may inhibit the growth of lithium dendrites, and on the other hand, due to the good heat resistance of the first inorganic particle and direct contact with the porous substrate, heat shrinkage of the first porous substrate and the second porous substrate may be prevented, so as to improve the heat shrink resistance of the separator.

In the case of normal use of an electrochemical device (such as a lithium ion battery), that is, when the porous substrate (the first porous substrate or the second porous substrate) on the first coating layer 2 facing the negative electrode has not been pierced by the lithium dendrites grown on the negative electrode, the substance that reversibly intercalates and deintercalates lithium in the first coating layer 2 may not cause an electrochemical reaction as the first coating layer 2 is not electrically conductive, so that the first efficiency of the electrochemical device (such as lithium ion battery) may not be reduced, and loss of energy density of the electrochemical device (such as the lithium ion battery) may not be caused. At the same time, since the substance that reversibly intercalates and deintercalates lithium and the first inorganic particle in the first coating layer 2 have a good wetting effect on the electrolytic solution, with combination of pore formation by the first inorganic particle, the first coating layer 2 may absorb the liquid electrolyte (electrolytic solution), so that the excess electrolytic solution is stored in the first coating layer 2 to ensure that the electrolytic solution is stored between the positive and negative electrodes, thereby making the electrolytic solution do not appear on the surface of the electrode assembly for a better liquid retention effect, further improving the liquid rising phenomenon of an electrochemical device such as a lithium ion battery.

If the electrochemical device (such as a lithium ion battery) is abused to produce lithium dendrites, during the growth of lithium dendrites, the lithium dendrites will first pierce the porous substrate (the first porous substrate or the second porous substrate) near the side of the negative electrode, and then contacts with the substance that reversibly intercalates and deintercalates lithium in the first coating layer 2, causing the first coating layer 2 to be electrically conductive, at which point the first coating layer 2 also becomes part of the negative electrode of the electrochemical device, such as a lithium ion battery. Due to electron conduction, the substance that reversibly intercalates and deintercalates lithium in the first coating layer 2 begins to undergo an electrochemical reaction (lithium intercalation reaction), which rapidly increases the intercalation channel of lithium ions, that is, a large amount of lithium ions are embedded in the substance that reversibly intercalates and deintercalates lithium in the first coating layer 2. Since lithium ions accumulated on the surface of the negative electrode are rapidly consumed, the further growth of lithium dendrites is suppressed, thereby greatly reducing the safety risk caused by the growth of lithium dendrites piercing the porous substrate (the first porous substrate or the second porous substrate) facing the positive electrode side. In addition, when the electrochemical device (such as a lithium ion battery) is discharged, since the lithium dendrite connects the negative electrode and the first coating layer 2, the first coating layer 2 is electrically turned on, and the lithium embedded in the substance that reversibly intercalates and deintercalates lithium in the first coating layer 2 loses electrons and becomes lithium ions to return to the electrolytic solution while part of the lithium in the lithium dendrites also losing electrons and turning into lithium ions to return to the electrolytic solution, so that the lithium dendrites are disconnected from the first coating layer 2. Once the lithium dendrites are disconnected from the first coating layer 2, the first coating layer 2 is no longer electrically conductive, and no electrochemical reaction occurs. The entire process inhibits the growth of lithium dendrites during the next charge to create a lithium intercalation space.

The porous substrates 1 are a polymer film, a multilayer polymer film, or a nonwoven fabric formed by any one or more of polyethylene, polypropylene, Polyethylene terephthalate, polyphthalaldehyde phenyl diamine, polybutylene terephthalate, polyester, polyacetal, polyamide, polycarbonate, polyimide, polyetheretherketone, polyaryletherketone, polyethersulfone, polyamideimide, polybenzimidazole, polyethersulfone, polyphenylene ether, cyclic olefin copolymer, polyphenylene sulfide and polyethylene naphthalene. The polyethylene is selected from at least one component of high-density polyethylene, low-density polyethylene, and ultra-high-molecular-weight polyethylene. The porous substrates 1 have an average pore diameter of 0.001 μm to 10 μm. The porous substrates 1 have a porosity of 5% to 95%. In addition, the porous substrates 1 have a thickness of between 0.5 μm and 50 μm.

The substance that reversibly intercalates and deintercalates lithium is selected from one or more of artificial graphite, natural graphite, mesocarbon microbeads (MCMB), soft carbon, hard carbon, silicon, tin, silicon oxide, silicon carbon composites, titanium-niobium oxide, lithiumtitanate. The first coating layer 2 has a thickness of between 0.05 μm and 10 μm. Since the first coating layer 2 is too thin, it is difficult to process on the one hand, and on the other hand, the first coating layer 2 is too thin so that the content of the substance that reversibly intercalates and deintercalates lithium is too small, the effect of intercalating and deintercalating lithium during the cycle is limited, and the formation of lithium dendrites may not be effectively inhibited. The first coating layer 2 is too thick, resulting in an excess of the substance that reversibly intercalates and deintercalates lithium, and excessive substance that reversibly intercalates and deintercalates lithium not only no longer acts to intercalates and deintercalates lithium, but also reduces the energy density of the entire electrochemical device, such as a lithium ion battery.

The first inorganic particles are not particularly limited as long as they are electrochemically stable. In other words, the inorganic particles which may be used in the present application are not particularly limited as long as they are not subject to oxidation and/or reduction in the driving voltage range (e.g., 0 to 5 V based on $Li/Li^+$) of electrochemical devices (e.g., lithium ion batteries) to which they are applied. In particular, inorganic particles having as high ion conductivity as possible are used, since such inorganic particles may improve the ion conductivity and quality of the electrochemical device such as a lithium ion battery. In addition, when inorganic particles having a high density are used, they are difficult to disperse in the coating step and may increase the weight of the electrochemical device (for example, a lithium ion battery) to be manufactured. Therefore, inorganic particles having the lowest possible density are used. Further, when inorganic particles having a high dielectric constant are used, they may contribute to an increase in the degree of dissociation of an electrolyte salt such as a lithium salt in a liquid electrolyte, thereby improving the ion conductivity of the electrolyte. For these reasons, in the present application, an inorganic particle having a dielectric constant of 5 or more, an inorganic particle with piezoelectricity and an inorganic particle with lithium ion conductivity, or a mixture thereof, are used.

Non-limiting examples of the inorganic particle having a dielectric constant of 5 or more include $SrTiO_3$, $SnO_2$, $CeO_2$, $MgO$, $NiO$, $CaO$, $ZnO$, $ZrO_2$, $Y_2O_3$, $Al_2O_3$, $TiO_2$, boehmite, magnesium hydroxide, $SiC$, or a mixture thereof.

Generally, a material having piezoelectricity refers to a material which is an insulator at normal pressure but allows a current to pass due to a change in its internal structure when a certain range of pressure is applied thereto. The inorganic particle with piezoelectricity exhibits a high dielectric constant of 100 or more. When a certain range of pressure is applied to stretch or compress them, they are positively charged on one surface and negatively charged on the other surface. Therefore, the inorganic particle with piezoelectricity generates a potential difference between their two surfaces. When the inorganic particles having the above characteristics are used in the first coating layer 2, and when an internal short circuit occurs between the two electrodes due to an external impact such as partial crushing, nailing or the like, the positive electrode and the negative electrode may be prevented from directly contacting each other. In addition, the piezoelectricity of the inorganic particles may allow a potential difference to be generated in the particles, thereby allowing electron movement, that is, a minute flow of current between the two electrodes. Therefore, it is possible to achieve a slow voltage reduction of an electrochemical device such as a lithium ion battery and to improve the safety of an electrochemical device such as a lithium ion battery. Non-limiting examples of inorganic particle with piezoelectric property include $BaTiO_3$, $Pb(Zr,Ti)O_3$(PZT), $Pb_{1-x}La_xZr_{1-y}Ti_yO_3$ (PLZT), $Pb(Mg_{1/3}Nb_{2/3})O_3$—$PbTiO_3$ (PMN-PT) and cerium oxide ($HfO_2$) or a mixture thereof.

"Inorganic particles having lithium ion conductivity" means that inorganic particles contain lithium and have the ability to conduct lithium ions without storing lithium. Since defects in the structure of the inorganic particles having lithium ion conductivity may conduct and move lithium ions, lithium ion conductivity of an electrochemical device such as a lithium ion battery may be improved and the quality of the electrochemical device such as a lithium ion battery may be improved. Non-limiting examples of such inorganic particles having lithium ion conductivity include lithium phosphate ($Li_3PO_4$), lithium titanium phosphate ($Li_xTi_y(PO_4)_3$, $0<x<2$, $0<y<3$)), lithium aluminum titanium phosphate ($Li_xAl_yTi_z(PO_4)_3$, $0<x<2$, $0<y<1$, $0<z<3$)), (Li-AlTiP)$_xO_y$-type glass such as $14Li_2O$-$9Al_2O_3$-$38TiO_2$-$39P_2O_5$ ($0<x<4$, $0<y<13$), lithium strontium titanate ($Li_xLa_yTiO_3$, $0<x<2$, $0<y<3$), lithium thiophosphate such as $Li_{3.25}Ge_{0.25}P_{0.75}S_4$ ($Li_xGe_yP_zS_w$, $0<x<4$, $0<y<1$, $0<z<1$, $0<w<5$), lithium nitride such as $Li_3N$ ($Li_xN_y$, $0<x<4$, $0<y<2$), $SiS_2$-type glass such as $Li_3PO_4$—$Li_2S$—$SiS_2$ (LixSiySz, $0<x<3$, $0<y<2$, $0<z<4$), $P_2S_5$-type glass such as $LiI$—$Li_2S$—$P_2S_5$ ($Li_xP_yS_z$, $0<x<3$, $0<y<3$, $0<z<7$) or a mixture thereof.

The average particle diameter (Dv50) of the first inorganic particle is from 0.001 μm to 15 μm. The presence of the first inorganic particle in the first coating layer 2 may significantly increase the porosity of the first coating layer. The presence of these pores contributes to the infiltration of the electrolyte on the one hand, and facilitates the passage of lithium ions on the other hand, thereby improving the rate performance of the electrochemical device. In addition, since the first inorganic particle has a higher hardness than the substance that reversibly intercalates and deintercalates lithium and the binder, the overall hardness of the first coating layer may be increased, which may also prevent the growth of lithium dendrites to some extent. If the average particle diameter of the first inorganic particles is less than 0.001 μm, the inorganic particles have poor dispersibility and even agglomeration, resulting in weak pore-forming ability, affecting the passage of lithium ions, thereby affecting the rate performance of the electrochemical device. If the average particle diameter of the first inorganic particles is larger than 15 μm, on the one hand, the thickness of the first coating layer may not be made thin, which affects the energy density of the electrochemical device, and on the other hand, the contact area of the first inorganic particles and the porous substrate is small, so that the heat shrinkage of the porous substrate may not be effectively reduced.

When the mass ratio value of the first inorganic particle to the substance that reversibly intercalates and deintercalates lithium is within a certain range, the first coating layer may exert a good overall effect. When the mass ratio value of the first inorganic particle to the substance that reversibly intercalates and deintercalates lithium is 0.1 to 16, the heat shrinkage rate of the separator may be effectively reduced, and the growth of lithium dendrites may be effectively suppressed to some extent, so that the heat shrinkage resistance of the separator and the ability to inhibit the growth of lithium dendrites may be improved to the maximum extent.

In some examples, the first coating layer further includes a binder. The binder is selected from one or more of vinyl fluoride-hexafluoropropylene copolymer, vinylidene fluoride-trichloroethylene copolymer, polystyrene, polyacrylate, polyacrylic acid, polyacrylic acid salt, polyacrylonitrile, polyvinylpyrrolidone, polyvinyl acetate, ethylene-vinyl acetate copolymer, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, carboxymethyl cellulose, sodium carboxymethyl cellulose, lithium carboxymethyl cellulose, acrylonitrile-styrene-butadiene copolymer, polyphthalaldehyde phenyl diamine, polyvinyl alcohol, styrene-butadiene copolymer and polyvinylidene fluoride.

Figure 2:
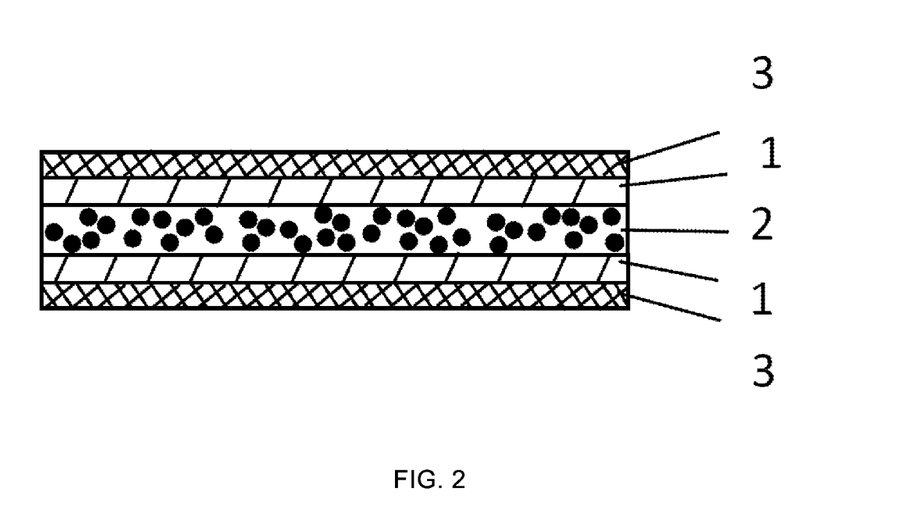
FIG. 2 shows a schematic view of the separator according to some other examples of the present application.

As shown in FIG. 2, in some examples, a surface of the porous substrates 1 remote from the first coating layer 2 further includes a second coating layer 3, and the second coating layer 3 includes one or both of a second inorganic particle and a polymer. Although both the surface of the first porous substrate remote from the first coating layer 2 and a surface of the second porous substrate remote from the first coating layer 2 include a second coating layer 3 as shown in FIG. 2, it is also possible to include the second coating layer only on the surface of the first porous substrate remote from the first coating layer 2 or only on the surface of the second porous substrate remote from the first coating layer 2. Similarly, the second inorganic particle may also be selected from at least one of a) an inorganic particle having a dielectric constant of 5 or more, b) an inorganic particle with piezoelectricity and c) an inorganic particle with lithium ion conductivity. The material of the second inorganic particle and the first inorganic particle may be the same or different. That is, the first inorganic particle and the second inorganic particle are each independently selected from at least one of a) an inorganic particle having a dielectric constant of 5 or more, b) an inorganic particle with piezoelectricity and c) an inorganic particle with lithium ion conductivity. Therefore, the materials which the second inorganic particles may be used are not repeatedly described herein.

The average particle diameter (Dv50) of the second inorganic particle is from 0.001 μm to 15 μm. The presence of the second inorganic particle in the second coating layer may significantly increase the porosity of the second coating layer. The presence of these pores contributes to the infiltration of the electrolyte on the one hand, and facilitates the passage of lithium ions on the other hand, thereby improving the rate performance of the electrochemical device. If the average particle diameter of the second inorganic particles is less than 0.001 μm, the inorganic particles have poor dispersibility and even agglomeration, resulting in weak pore-forming ability, affecting the passage of lithium ions, thereby affecting the rate performance of the electrochemical device. If the average particle diameter of the second inorganic particles is larger than 15 μm, on the one hand, the thickness of the second coating layer may not be made thin, which affects the energy density of the electrochemical device, and on the other hand, the contact area of the second inorganic particles and the porous substrate is small, so that the heat shrinkage of the porous substrate may not be effectively reduced.

The polymer in the second coating layer is selected from one or more of vinyl fluoride-hexafluoropropylene copolymer, vinylidenefluoride-trichloroethylene copolymer, polystyrene, polyacrylate, polyacrylic acid, polyacrylic acid salt, polyacrylonitrile, polyvinylpyrrolidone, polyvinyl acetate, ethylene-vinyl acetate copolymer, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, carboxymethyl cellulose, sodium carboxymethyl cellulose, lithium carboxymethyl cellulose, acrylonitrile-styrene-butadiene copolymer, polyphthalaldehyde phenyl diamine, polyvinyl alcohol, styrene-butadiene copolymer and polyvinylidene fluoride. The polyacrylate includes one or more of poly (methyl methacrylate), poly (ethyl acrylate), poly (propyl acrylate) and poly (butyl acrylate).

The content of the second inorganic particle is not particularly limited. However, the weight percentage of the second inorganic particle is from 40% to 99% based on total weight of the second coating layer. If the weight percentage of the second inorganic particles is less than 40%, the polymer is present in a large amount, thereby reducing the gap volume formed between the second inorganic particles, and reducing the pore diameter and porosity, resulting in slower conduction of lithium ions, and performance degradation electrochemical device (such as lithium ion battery). If the weight percentage of the second inorganic particles is more than 99%, the content of the polymer is too low to sufficiently adhere to the second inorganic particles, resulting in a decrease in mechanical properties of the finally formed separator.

An exemplary preparation method of the separator of the present application is described below. The method comprises dissolving a binder into a solvent to form a first solution; adding a substance that reversibly intercalates and deintercalates lithium and a first inorganic particle to a first solution, and mixing the same to obtain a first slurry; coating the first slurry onto one surface of a first porous substrate, and then laminating a second porous substrate on a surface of the first coating layer, followed by lamination, so that the first porous substrate, the first coating layer and the second porous substrate are integrated to prepare the separator as shown in FIG. 1 after drying.

Specifically, first, the binder is dissolved in a suitable solvent to provide a first solution. The solvent has the same solubility parameter and a low boiling point as the binder used because such a solvent is easily mixed uniformly and easily removed. Adding the substance that reversibly intercalates and deintercalates lithium and the first inorganic particles and dispersing in the first solution obtained by the foregoing steps is to provide a mixture of the substance that reversibly intercalates and deintercalates lithium, the first inorganic particles, and the binder for forming the first slurry. The solvent which may be used is selected from at least one of water, N-methyl-2-pyrrolidone, acetone, tetrahydrofuran, chloroform, dichloromethane, dimethylformamide and cyclohexane. The first slurry is coated onto one surface of a first porous substrate to form a first coating layer, and then a second porous substrate is laminated on a surface of the first coating layer, followed by lamination, so that the first porous substrate, the first coating layer and the second porous substrate are integrated to prepare the separator as shown in FIG. 1 after drying.

In order to coat the first slurry on the surface of the first porous substrate, any method known to those skilled in the art may be used, including dip coating, die coating, roll coating, knife coating, or a combination thereof.

The present application also provides a lithium ion battery including above separator. In the present application, a lithium ion battery is merely an illustrative example of an electrochemical device, which may also include other suitable devices. The lithium ion battery further comprises a positive electrode, a negative electrode and an electrolyte, wherein the separator of the present application is inserted between the positive electrode and the negative electrode. The positive current collector may be an aluminum foil and a nickel foil, and the negative current collector may be a copper foil or a nickel foil.

Positive Electrode

The positive electrode includes a positive electrode material including a positive electrode material (hereinafter, sometimes referred to as "positive electrode material capable of intercalating/deintercalating lithium Li") capable of intercalating and deintercalating lithium (Li). Examples of the positive electrode material capable of intercalating/deintercalating lithium Li may include lithium cobaltate, lithium nickel cobalt manganese oxide, lithium nickel cobalt aluminate, lithium manganate, lithium manganese iron phosphate, lithium vanadium phosphate, lithium vanadium phosphate, lithium iron phosphate, lithium titanate, and lithium-rich manganese-based materials.

Specifically, the chemical formula of lithium cobaltate may be as chemical formula 1:

$$Li_xCo_aM1_bO_{2-c} \qquad \text{chemical formula 1}$$

wherein M1 represents at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon (Si), and the values of x, a, b and c are respectively in the following ranges: $0.8 \le x \le 1.2$, $0.8 \le a \le 1$, $0 \le b \le 0.2$, $-0.1 \le c \le 0.2$;

the chemical formula of lithium nickel cobalt manganese oxide or lithium nickel cobalt aluminate may be as chemical formula 2:

$$Li_yNi_dM2_eO_{2-f} \qquad \text{chemical formula 2}$$

wherein M2 represents at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), and silicon (Si), and the values of y, d, e and f are respectively in the following ranges: $0.8 \le y \le 1.2$, $0.3 \le d \le 0.98$, $0.02 \le e \le 0.7$, $-0.1 \le f \le 0.2$;

the chemical formula of lithium manganese oxide may be as chemical formula 3:

$$Li_zMn_{2-g}M3_gO_{4-h} \qquad \text{chemical formula 3}$$

wherein M3 represents at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and the values of z, g, and h are respectively in the following ranges: $0.8 \le z \le 1.2$, $0 \le g \le 1.0$ and $-0.2 \le h \le 0.2$.

Negative Electrode

The negative electrode includes a negative electrode material including the negative electrode material (hereinafter, sometimes referred to as "positive electrode material capable of intercalating/deintercalating lithium Li") capable of intercalating and deintercalating lithium (Li). Examples of the negative electrode material capable of intercalating/deintercalating lithium Li may include carbon materials, metal compounds, oxides, sulfides, nitrides of lithium such as $LiN_3$, lithium metal, metals which form alloys together with lithium and polymer materials.

Examples of carbon materials may include low graphitized carbon, easily graphitizable carbon, artificial graphite, natural graphite, mesocarbon microbeads, soft carbon, hard carbon, pyrolytic carbon, coke, vitreous carbon, organic polymer compound sintered body, carbon fiber and activated carbon. Among them, coke may include pitch coke, needle coke, and petroleum coke. The organic polymer compound sintered body refers to a material obtained by calcining a polymer material such as a phenol plastic or a furan resin at a suitable temperature for carbonizing, and some of these materials are classified into low graphitized carbon or easily graphitizable carbon. Examples of the polymer material may include polyacetylene and polypyrrole.

Further, in the negative electrode material capable of intercalating/deintercalating lithium Li, a material who's charging and discharging voltages are close to the charging and discharging voltages of lithium metal is selected. This is because the lower the charging and discharging voltage of the negative electrode material, the easier the electrochemical device (such as lithium ion battery) is to have a higher energy density. Among them, the negative electrode material may be selected from carbon materials because their crystal structures are only slightly changed upon charging and discharging, and therefore, good cycle characteristics as well as large charge and discharge capacities may be obtained. In particular, graphite may be selected because it gives a large electrochemical equivalent and a high energy density.

In addition, the negative electrode material capable of intercalating/deintercalating lithium (Li) may include elemental lithium metal, metal elements and semimetal elements capable of forming an alloy together with lithium (Li), and alloys and compounds of such elements. In particular, they are used together with carbon materials because in this case, good cycle characteristics as well as high energy density may be obtained. In addition to alloys comprising two or more metal elements, the alloys used herein also include alloys comprising one or more metal elements and one or more semi-metal elements. The alloy may be in the form of a solid solution, a eutectic crystal (eutectic mixture), an intermetallic compound, and a mixture thereof.

Examples of the metal element and the semi-metal element may include tin (Sn), lead (Pb), aluminum (Al), indium (In), silicon (Si), zinc (Zn), antimony (Sb), bismuth (Bi), Cadmium (Cd), magnesium (Mg), boron (B), gallium (Ga), germanium (Ge), arsenic (As), silver (Ag), zirconium (Zr), yttrium (Y), and hafnium (Hf). Examples of above alloys and compounds may include a material having a chemical formula $Ma_sMb_tLi_u$ and a material having a chemical formula $Ma_pMc_qMd_r$. In these chemical formulae, Ma denotes at least one of a metal element and a semi-metal element capable of forming an alloy together with lithium; Mb denotes at least one of a metal element and a semi-metal element other than lithium and Ma; Mc denotes at least one of the non-metallic elements; Md denotes at least one of a metal element and a semi-metal element other than Ma; and s, t, u, p, q and r meets $s>0$, $t\geq0$, $u\geq0$, $p>0$, $q>0$ and $r\geq0$.

Further, an inorganic compound not including lithium (Li) such as $MnO_2$, $V_2O_5$, $V_6O_{13}$, NiS, and MoS may be used in the negative electrode.

Electrolyte

The above lithium ion battery further includes an electrolyte which may be one or more of a gel electrolyte, a solid electrolyte and an electrolytic solution, and the electrolytic solution includes a lithium salt and a non-aqueous solvent.

The lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, the lithium salt selects $LiPF_6$ because it may give high ionic conductivity and improved cycle characteristics.

The non-aqueous solvent may be a carbonate compound, a carboxylate compound, an ether compound, other organic solvents, or a combination thereof.

The carbonate compound may be a chain carbonate compound, a cyclic carbonate compound, a fluorocarbonate compound, or a combination thereof.

Examples of the chain carbonate compound are diethyl carbonate (DEC), dimethyl carbonate (DMC), dipropyl carbonate (DPC), methylpropyl carbonate (MPC), ethylene propyl carbonate (EPC), and methyl ethyl carbonate (MEC) and combinations thereof. Examples of the cyclic carbonate compound are ethylene carbonate (EC), propylene carbonate (PC), butylene carbonate (BC), vinyl ethylene carbonate (VEC), and combinations thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, and combinations thereof.

Examples of the carboxylate compound are methyl acetate, ethyl acetate, n-propyl acetate, t-butyl acetate, methyl propionate, ethyl propionate, propyl propionate, γ-butyrolactone, azlactone, valerolactone, mevalonolactone, caprolactone, methyl formate and combinations thereof.

Examples of the ether compounds are dibutyl ether, tetraglyme, diglyme, 1,2-dimethoxyethane, 1,2-diethoxyethane, ethoxymethoxyethane, 2-methyltetrahydrofuran, tetrahydrofuran, and combinations thereof.

Examples of other organic solvents are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate and phosphate, and combinations thereof.

Although the above is exemplified by a lithium ion battery, those skilled in the art can understand that the separator of the present application may be used for other suitable electrochemical devices after reading the present application. Such electrochemical devices include any devices that generate an electrochemical reaction, and specific examples thereof include all kinds of primary batteries, secondary batteries, fuel batteries, solar batteries, or capacitors.

The electrochemical device may be fabricated using conventional methods known to those skilled in the art. In one example of the method of fabricating an electrochemical device, the electrode assembly is formed with a separator interposed between the positive electrode and the negative electrode, and then a liquid electrolyte is injected into the electrode assembly, thereby providing the electrochemical device. Depending on the method of manufacture and the required properties for the final product, the electrolyte may be injected in a suitable step during the manufacturing process of the electrochemical device. In other words, the liquid electrolyte may be injected prior to assembly of the electrochemical device or at the final step during assembly of the electrochemical device.

Specifically, the electrochemical device of the present application may be a lithium ion battery, and the electrode assembly of the lithium ion battery may be a wound type, a laminated (stacked) type, and a folded type. In particular, the entire separator of the wound electrode assembly is a unitary body, and the first coating layer 2 is also integrated into one body, so as to ensure that when the lithium dendrite is connected to the negative electrode and the first coating layer 2 at one point, the entire first coating layer 2 may intercalates and deintercalates lithium. In this way, the utilization ratio of the first coating layer 2 is increased, so that the thickness of the first coating layer 2 may be reduced as much as possible, and the utilization rate of the material that reversibly intercalates and deintercalates lithium is improved. Therefore, the energy density of the lithium ion battery may also be unaffected.

Hereinafter, a lithium ion battery is taken as an example and a preparation of the lithium ion battery is described in conjunction with specific examples. Those skilled in the art will understand that the preparation method described in the present application is merely an example, and any other suitable preparation methods are within the scope the present application.

The preparation process of the lithium ion battery of the examples and comparative examples of the present application is as follows:

Comparative Example 1

(1) Preparation of Separator

A substance of artificial graphite that reversibly intercalates and deintercalates lithium, a binder of styrene butadiene rubber (SBR), a thickener of sodium carboxymethyl cellulose (CMC) is dissolved in a deionized water at a mass ratio of 96:2:2 to prepare a uniform slurry, the slurry is coated on one surface of the first porous substrate (polyethylene, with thickness of 5 μm, average pore diameter of 0.073 μm, and porosity of 26%) to form a first coating layer, then a second porous substrate (polyethylene, with thickness of 5 μm, average pore diameter of 0.073 μm, and porosity of 26%) is laminated on the surface of the first coating layer, followed by lamination, so that the first porous substrate, the first coating layer and the second porous substrate are integrated to prepare a separator required after drying. Among them, the first coating layer has a thickness of 2 μm.

(2) Preparation of the Positive Electrode

A positive active substance of $LiCo_{0.92}Mg_{0.03}Al_{0.02}Ti_{0.03}O_2$, a conductive agent of acetylene black, and a binder of polyvinylidene fluoride (PVDF) are dissolved in an N-methylpyrrolidone solvent system at a weight ratio of 94:3:3 for thoroughly stirring and uniformly mixing then coated on a positive current collector of aluminum foil for drying, cold-pressing, and slitting to obtain a positive electrode.

(3) Preparation of the Negative Electrode

A negative active substance of artificial graphite, a conductive agent of acetylene black, a binder of styrene-butadiene rubber (SBR), and a thickener of sodium carboxymethyl cellulose (CMC) are dissolved in a deionized water solvent system according to the weight ratio of 96:1:1.5:1.5, then coated on a negative current collector of Cu foil for drying, cold-pressing, and slitting to obtain a negative electrode.

(4) Preparation of Electrolytic Solution

A solution prepared by mixing a lithium salt of $LiPF_6$ and a non-aqueous organic solvent (ethylene carbonate (EC): diethyl carbonate (DEC):propylene carbonate (PC):propyl propionate (PP):vinylene carbonate (VC)=20:30:20:28:2) at a mass ratio of 8:92 is used as an electrolyte of the lithium ion battery.

(5) Preparation of Lithium Ion Battery

The positive electrode, the separator, and the negative electrode are stacked in this order, so that the separator is in the middle of the positive electrode and the negative electrode to function as a safe isolation, and then an electrode assembly is obtained by winding. The electrode assembly is placed in package housing, injected with an electrolytic solution and packaged to obtain the lithium ion battery.

Comparative Example 2

The preparation method is the same as that of Comparative Example 1, except that a separator having a thickness of 12 μm (polyethylene, with average pore diameter of 0.077 μm and porosity of 27%) is used in Comparative Example 2.

Example 1

The preparation method is the same as that of Comparative Example 1, except that the preparation method of the separator of Example 1 is as follows:

A substance of artificial graphite that reversibly intercalates and deintercalates lithium, a first inorganic particle of alumina ($Al_2O_3$), a binder of styrene butadiene rubber (SBR), a thickener of sodium carboxymethyl cellulose (CMC) is dissolved in a deionized water at a mass ratio of 60:36:2:2 to prepare a uniform slurry, the slurry is coated on one surface of the first porous substrate (polyethylene, with thickness of 5 μm, average pore diameter of 0.073 μm, and porosity of 26%) to form a first coating layer, then a second porous substrate (polyethylene, with thickness of 5 μm, average pore diameter of 0.073 μm, and porosity of 26%) is laminated on the surface of the first coating layer, followed by lamination, so that the first porous substrate, the first coating layer and the second porous substrate are integrated to prepare the separator as shown in FIG. 1 after drying. Among them, the thickness of the first coating layer is 2 μm, the average particle diameter of the first inorganic particle of alumina ($Al_2O_3$) is 1.2 μm, and the mass ratio of alumina to artificial graphite is 0.6.

Example 2

The preparation method is the same as that of Example 1, except that the first inorganic particle used in the first coating layer in Example 2 is boehmite.

Example 3

The preparation method is the same as that of Example 1, except that the first inorganic particle used in the first coating layer in Example 3 is magnesium hydroxide.

Example 4

The preparation method is the same as that of Example 1, except that the first inorganic particle used in the first coating layer in Example 4 is a mixture in which each of alumina and boehmite is half.

Example 5

The preparation method is the same as that of Example 1, except that the first inorganic particle used in the first coating layer in Example 5 is $BaTiO_3$.

Example 6

The preparation method is the same as that of Example 1, except that the first inorganic particle used in the first coating layer in Example 6 is $Li_3PO_4$.

Example 7

The preparation method is the same as that of Example 1, except that the substance that reversibly intercalates and deintercalates lithium used in the first coating layer in Example 7 is natural graphite.

Example 8

The preparation method is the same as that of Example 1, except that the substance that reversibly intercalates and deintercalates lithium used in the first coating layer in Example 8 is mesocarbon microbeads.

Example 9

The preparation method is the same as that of Example 1, except that the substance that reversibly intercalates and deintercalates lithium used in the first coating layer in Example 9 is lithium titanate.

Example 10

The preparation method is the same as that of Example 1, except that the mass ratio value of the first inorganic particle to the substance that reversibly intercalates and deintercalates lithium in the first coating layer in Example 10 is 0.1.

Example 11

The preparation method is the same as that of Example 1, except that the mass ratio value of the first inorganic particle to the substance that reversibly intercalates and deintercalates lithium in the first coating layer in Example 11 is 0.3.

Example 12

The preparation method is the same as that of Example 1, except that the mass ratio value of the first inorganic particle to the substance that reversibly intercalates and deintercalates lithium in the first coating layer in Example 12 is 1.8.

Example 13

The preparation method is the same as that of Example 1, except that the mass ratio value of the first inorganic particle to the substance that reversibly intercalates and deintercalates lithium in the first coating layer in Example 13 is 6.2.

Example 14

The preparation method is the same as that of Example 1, except that the mass ratio value of the first inorganic particle to the substance that reversibly intercalates and deintercalates lithium in the first coating layer in Example 14 is 11.6.

Example 15

The preparation method is the same as that of Example 1, except that the mass ratio value of the first inorganic particle to the substance that reversibly intercalates and deintercalates lithium in the first coating layer in Example 15 is 16.

Example 16

The preparation method is the same as that of Example 1, except that the average particle size of the first inorganic particle used in the first coating layer in Example 16 is 0.001 µm.

Example 17

The preparation method is the same as that of Example 1, except that the average particle size of the first inorganic particle used in the first coating layer in Example 17 is 0.16 µm.

Example 18

The preparation method is the same as that of Example 1, except that the average particle size of the first inorganic particle used in the first coating layer in Example 18 is 0.72 µm.

Example 19

The preparation method is the same as that of Example 1, except that the average particle size of the first inorganic particle used in the first coating layer in Example 19 is 2.8 µm.

Example 20

The preparation method is the same as that of Example 1, except that the average particle size of the first inorganic particle used in the first coating layer in Example 19 is 6.7 µm.

Example 21

The preparation method is the same as that of Example 1, except that the average particle size of the first inorganic particle used in the first coating layer in Example 21 is 14.6 µm.

Example 22

The preparation method is the same as that of Example 1, except that the thickness of the first coating layer in Example 22 is 0.05 µm.

Example 23

The preparation method is the same as that of Example 1, except that the thickness of the first coating layer in Example 23 is 0.6 µm.

Example 24

The preparation method is the same as that of Example 1, except that the thickness of the first coating layer in Example 24 is 5 µm.

Example 25

The preparation method is the same as that of Example 1, except that the thickness of the first coating layer in Example 25 is 10 μm.

Example 26

The preparation method is the same as that of Example 1, except that a stacked type electrode assembly is employed in Example 26.

Example 27

The preparation method is the same as that of Example 1, except that a folded type electrode assembly is employed in Example 27.

Example 28

The preparation method is the same as that of Comparative Example 1, except that the preparation method of the separator of Example 28 is as follows:

A substance of artificial graphite that reversibly intercalates and deintercalates lithium, a first inorganic particle of alumina ($Al_2O_3$), a binder of styrene butadiene rubber (SBR), a thickener of sodium carboxymethyl cellulose (CMC) is dissolved in a deionized water at a mass ratio of 60:36:2:2 to prepare a uniform slurry, the slurry is coated on one surface of the first porous substrate (polyethylene, with thickness of 5 μm, average pore diameter of 0.073 μm, and porosity of 26%) to form a first coating layer, then a second porous substrate (polyethylene, with thickness of 5 μm, average pore diameter of 0.073 μm, and porosity of 26%) is laminated on the surface of the first coating layer, followed by lamination, so that the first porous substrate, the first coating layer and the second porous substrate are integrated to prepare the separator as shown in FIG. 1 after drying. Among them, the thickness of the first coating layer is 2 μm, the average particle diameter of the first inorganic particle of alumina ($Al_2O_3$) is 1.2 μm, and the mass ratio of alumina to artificial graphite is 0.6.

5 parts by weight of polyvinylidene fluoride (PVDF) is added as a polymer and dissolved in 95 parts by weight of acetone as a solvent for about 12 hours or more to form a second slurry that may be coated, which is coated on the other surface of the first porous substrate and the second porous substrate of the separator obtained in the above steps to form a second coating layer after drying, wherein the thickness of the second coating layer is 2 μm.

Example 29

The preparation method is the same as that of Comparative Example 1, except that the preparation method of the separator of Example 29 is as follows:

A substance of artificial graphite that reversibly intercalates and deintercalates lithium, a first inorganic particle of alumina ($Al_2O_3$), a binder of styrene butadiene rubber (SBR), a thickener of sodium carboxymethylcellulose (CMC) is dissolved in a deionized water at a mass ratio of 60:36:2:2 to prepare a uniform slurry, the slurry is coated on one surface of the first porous substrate (polyethylene, with thickness of 5 μm, average pore diameter of 0.073 μm, and porosity of 26%) to form a first coating layer, then a second porous substrate (polyethylene, with thickness of 5 μm, average pore diameter of 0.073 μm, and porosity of 26%) is laminated on the surface of the first coating layer, followed by lamination, so that the first porous substrate, the first coating layer and the second porous substrate are integrated to prepare the separator as shown in FIG. 1 after drying. Among them, the thickness of the first coating layer is 2 μm, the average particle diameter of the first inorganic particle of alumina ($Al_2O_3$) is 1.2 μm, and the mass ratio of alumina to artificial graphite is 0.6.

5 parts by weight of polyvinylidene fluoride (PVDF) is added as a polymer and dissolved in 95 parts by weight of acetone as a solvent for a period of about 12 hours or more to obtain a second solution. A second inorganic particle of alumina having a Dv50 of 0.4 μm is mixed and dispersed in the prepared second solution so that the mass ratio of the polymer to the second inorganic particle is 14:86 to form a second slurry that may be coated, which is coated on the other surface of the first porous substrate and the second porous substrate of the separator obtained in the above steps to form a second coating layer after drying, wherein the thickness of the second coating layer is 2 μm.

Example 30

The preparation method is the same as that of Comparative Example 1, except that the preparation method of the separator of Example 30 is as follows:

A substance of artificial graphite that reversibly intercalates and deintercalates lithium, a first inorganic particle of alumina ($Al_2O_3$), a binder of styrene butadiene rubber (SBR), a thickener of sodium carboxymethyl cellulose (CMC) is dissolved in a deionized water at a mass ratio of 60:36:2:2 to prepare a uniform slurry, the slurry is coated on one surface of the first porous substrate (polyethylene, with thickness of 5 μm, average pore diameter of 0.073 μm, and porosity of 26%) to form a first coating layer, then a second porous substrate (polyethylene, with thickness of 5 μm, average pore diameter of 0.073 μm, and porosity of 26%) is laminated on the surface of the first coating layer, followed by lamination, so that the first porous substrate, the first coating layer and the second porous substrate are integrated to prepare the separator as shown in FIG. 1 after drying. Among them, the thickness of the first coating layer is 2 μm, the average particle diameter of the first inorganic particle of alumina ($Al_2O_3$) is 1.2 μm, and the mass ratio of alumina to artificial graphite is 0.6.

5 parts by weight of polyvinylidene fluoride (PVDF) is added as a polymer and dissolved in 95 parts by weight of acetone as a solvent for a period of about 12 hours or more to obtain a second solution. A second inorganic particle of boehmite having a Dv50 of 0.4 μm is mixed and dispersed in the prepared second solution so that the mass ratio of the polymer to the second inorganic particle is 22:78 to form a second slurry that may be coated, which is coated on the other surface of the first porous substrate and the second porous substrate of the separator obtained in the above steps to form a second coating layer after drying, wherein the thickness of the second coating layer is 2 μm.

Next, the test process of the lithium ion battery will be described.

1. Test for K Value

Six lithium ion batteries are taken for each test and averaged.

(1) Test for Initial Self-Discharge Rate of Lithium Ion Battery:

In a 25° C. environment, the lithium ion battery is charged to 3.85 V with a constant current of 0.7 C, and further charged to a current of 0.05 C at a constant voltage and an open circuit voltage of the lithium ion battery is measured at this time to be recorded as OCV1. Then, the lithium ion battery is left at room temperature for 48 hours, and the open circuit voltage of the lithium ion battery is tested again to be recorded as OCV2.

The initial self-discharge rate of the lithium ion battery at room temperature is K1=(OCV1−OCV2)/48.

(2) Test for Initial Self-Discharge Rate of Lithium Ion Battery at Extreme Conditions:

In the first step, in a 25° C. environment, the lithium ion battery in (1) is discharged to 3.0 V with a constant current of 0.5 C to ensure that the lithium ion remains as little as possible at the negative electrode before starting; in the second step, it is allowed to stand in the environment of 0° C. for 2 h, then charged to 4.4 V with a constant current of 1.5 C, and charged at a constant voltage to a current of 0.05 C (to ensure the generation of lithium dendrites as much as possible after full charge), then stood for five minutes; in the third step, it is discharged to 3.0 V with a constant current of 0.5 C. The second step and the third step are a rapid charge and discharge cycle process at a low temperature and large rate. According to the above method, the lithium ion battery is subjected to 200 low-temperature large-rate rapid charge-discharge cycles (the negative electrodelithium precipitation is exacerbated due to the consumption of liquid electrolyte during the cycle), then stood for 2 h at 25° C., charged to 4.4V with a constant current of 0.7 C, and further charged to a current of 0.05 C with a constant voltage, stood for five minutes, then discharged to 3.0V with a constant current of 0.5 C and allowed to stand for five minutes, again charged to 3.85V with a constant current of 0.7 C, and then charged to a constant current of 0.05 C, so as to test the open circuit voltage of the lithium ion battery at this time to record as OCV3. Subsequently, it is placed in an environment of 25° C. for 48 h, and the open circuit voltage of the lithium ion battery is again tested to be recorded as OCV4.

Initial self-discharge rate of lithium ion battery at extreme conditions: K2=(OCV3−OCV4)/48.

2. Cycle Performance Test

The lithium ion batteries prepared using all of the examples and comparative examples are repeatedly charged and discharged by the following procedures, the discharge capacity retention rate of the lithium ion battery is calculated.

Lithium-ion battery cycle performance test: The lithium-ion battery is placed in a 45° C. incubator and allowed to stand for 20 minutes to keep the lithium ion battery at a constant temperature. The lithium ion battery reaching constant temperature is charged at a constant current of 0.7 C to a voltage of 4.4 V, and then charged at a constant voltage of 4.4 V to a current of 0.05 C, and then discharged to a voltage of 3.0 V with a constant current of 1 C, which is a charge and discharge cycle. When the capacity for the first discharge is 100%, the charge and discharge cycle is repeated until the discharge capacity is attenuated to 80%, then the test is stopped, and the number of cycles is recorded as an index for evaluating the cycle performance of the lithium ion battery.

The experimental parameters and measurement results of Examples 1-30 and Comparative Examples 1-2 are shown in Table 1 below. For convenience of comparison, the results of Table 1 are shown in groups.

TABLE 1

| | | | Experimental parameters of the present application | | | |
|---|---|---|---|---|---|---|
| Examples | First inorganic particle | Substance that reversibly intercalates and deintercalates lithium | Mass ratio value of first inorganic particle to substance that reversibly intercalates and deintercalates lithium | Average particle size of first inorganic particle p/μm | Thickness of first coating layer/μm | Selection of second coating substance |
| 1 | Alumina | Artificial graphite | 0.6 | 1.2 | 2 | / |
| 2 | Boehmite | artificial graphite | 0.6 | 1.2 | 2 | / |
| 3 | Magnesium hydroxide | artificial graphite | 0.6 | 1.2 | 2 | / |
| 4 | Alumina and boehmite | artificial graphite | 0.6 | 1.2 | 2 | / |
| 5 | BaTiO$_3$ | artificial graphite | 0.6 | 1.2 | 2 | / |
| 6 | Li$_3$PO$_4$ | artificial graphite | 0.6 | 1.2 | 2 | / |
| 7 | Alumina | natural graphite | 0.6 | 1.2 | 2 | / |
| 8 | Alumina | mesocarbon microbeads | 0.6 | 1.2 | 2 | / |
| 9 | Alumina | Lithium titanate | 0.6 | 1.2 | 2 | / |
| 10 | Alumina | artificial graphite | 0.1 | 1.2 | 2 | / |
| 11 | Alumina | artificial graphite | 0.3 | 1.2 | 2 | / |
| 1 | Alumina | artificial graphite | 0.6 | 1.2 | 2 | / |
| 12 | Alumina | artificial graphite | 1.8 | 1.2 | 2 | / |
| 13 | Alumina | artificial graphite | 6.2 | 1.2 | 2 | / |
| 14 | Alumina | artificial graphite | 11.6 | 1.2 | 2 | / |
| 15 | Alumina | artificial graphite | 16 | 1.2 | 2 | / |
| 16 | Alumina | artificial graphite | 0.6 | 0.001 | 2 | / |
| 17 | Alumina | artificial graphite | 0.6 | 0.16 | 2 | / |
| 18 | Alumina | artificial graphite | 0.6 | 0.72 | 2 | / |
| 1 | Alumina | artificial graphite | 0.6 | 1.2 | 2 | / |
| 19 | Alumina | artificial graphite | 0.6 | 2.8 | 2 | / |
| 20 | Alumina | artificial graphite | 0.6 | 6.7 | 2 | / |
| 21 | Alumina | artificial graphite | 0.6 | 14.6 | 2 | / |
| 22 | Alumina | artificial graphite | 0.6 | 1.2 | 0.05 | / |
| 23 | Alumina | artificial graphite | 0.6 | 1.2 | 0.6 | / |
| 1 | Alumina | artificial graphite | 0.6 | 1.2 | 2 | / |
| 24 | Alumina | artificial graphite | 0.6 | 1.2 | 5 | / |
| 25 | Alumina | artificial graphite | 0.6 | 1.2 | 10 | / |
| 1 | Alumina | artificial graphite | 0.6 | 1.2 | 2 | / |
| 26 | Alumina | artificial graphite | 0.6 | 1.2 | 2 | / |
| 27 | Alumina | artificial graphite | 0.6 | 1.2 | 2 | / |
| 28 | Alumina | artificial graphite | 0.6 | 1.2 | 2 | PVDF |

TABLE 1-continued

| | | | | | | |
|---|---|---|---|---|---|---|
| 29 | Alumina | artificial graphite | 0.6 | 1.2 | 2 | PVDF and alumina |
| 30 | Alumina | artificial graphite | 0.6 | 1.2 | 2 | PVDF and boehmite |

Comparative Examples

| | | | | | | |
|---|---|---|---|---|---|---|
| 1 | / | artificial graphite | / | / | 2 | / |
| 2 | / | / | / | / | / | / |

| | Experimental parameters of the present application | | Lithium ion battery performance | | |
|---|---|---|---|---|---|
| Examples | Second inorganic particle content | Electrode assembly structure | Average K1 (mv/h) | Average K2 (mv/h) | Cycle Performance/ Rounds |
| 1 | / | Wound type | 0.035 | 0.069 | 736 |
| 2 | / | Wound type | 0.036 | 0.061 | 752 |
| 3 | / | Wound type | 0.035 | 0.070 | 723 |
| 4 | / | Wound type | 0.034 | 0.065 | 737 |
| 5 | / | Wound type | 0.035 | 0.068 | 715 |
| 6 | / | Wound type | 0.037 | 0.067 | 763 |
| 7 | / | Wound type | 0.034 | 0.070 | 731 |
| 8 | / | Wound type | 0.038 | 0.071 | 729 |
| 9 | / | Wound type | 0.36 | 0.078 | 735 |
| 10 | / | Wound type | 0.037 | 0.079 | 715 |
| 11 | / | Wound type | 0.036 | 0.071 | 719 |
| 1 | / | Wound type | 0.035 | 0.069 | 736 |
| 12 | / | Wound type | 0.035 | 0.063 | 752 |
| 13 | / | Wound type | 0.034 | 0.062 | 738 |
| 14 | / | Wound type | 0.034 | 0.072 | 732 |
| 15 | / | Wound type | 0.033 | 0.078 | 733 |
| 16 | / | Wound type | 0.036 | 0.064 | 701 |
| 17 | / | Wound type | 0.036 | 0.065 | 708 |
| 18 | / | Wound type | 0.035 | 0.067 | 718 |
| 1 | / | Wound type | 0.035 | 0.069 | 736 |
| 19 | / | Wound type | 0.035 | 0.071 | 751 |
| 20 | / | Wound type | 0.035 | 0.072 | 742 |
| 21 | / | Wound type | 0.035 | 0.074 | 745 |
| 22 | / | Wound type | 0.038 | 0.074 | 742 |
| 23 | / | Wound type | 0.036 | 0.071 | 741 |
| 1 | / | Wound type | 0.035 | 0.069 | 736 |
| 24 | / | Wound type | 0.033 | 0.062 | 727 |
| 25 | / | Wound type | 0.033 | 0.051 | 729 |
| 1 | / | Wound type | 0.035 | 0.069 | 736 |
| 26 | / | Stack type | 0.035 | 0.073 | 739 |
| 27 | / | Folded type | 0.035 | 0.070 | 732 |
| 28 | / | Wound type | 0.033 | 0.068 | 728 |
| 29 | 86% | Wound type | 0.033 | 0.063 | 725 |
| 30 | 78% | Wound type | 0.033 | 0.062 | 729 |

Comparative Examples

| | | | | | |
|---|---|---|---|---|---|
| 1 | / | Wound type | 0.037 | 0.072 | 636 |
| 2 | / | Wound type | 0.039 | 0.136 | 568 |

By comparing Examples 1-27 and Comparative Example 2, it is known that by using the separator of the present application, the average K1 and K2 of the lithium ion battery are significantly reduced, which indicates that the technical solution of the present application may significantly inhibited the growth of lithium dendrites under extreme conditions, and the cycle performance of the lithium ion battery is also significantly improved.

By comparing Examples 1-21 and Comparative Example 1, it is known that by using the first inorganic particle in the first coating layer of the separator, the variations in the average K1 and K2 of the lithium ion battery are not large, but the cycle performance of the lithium ion battery is remarkably improved.

By comparing Examples 1-6, it is known that the difference in the kind of the first inorganic particle in the first coating layer has little effect on the average K1 and K2 of the lithium ion battery, and has a certain influence on the cycle performance of the lithium ion battery.

By comparing Examples 7-9, it is known that the difference in the kind of the substance that reversibly intercalates and deintercalates lithium in the first coating has a slight influence on the average K1 and K2 and cycle performance of the lithium ion battery.

By comparing Example 1 and 10-15, it is known that as the mass ratio value of the first inorganic particle to the substance that reversibly intercalates and deintercalates lithium in the first coating layer increases, the average K1 of lithium ion battery has a certain decreasing trend, and the average K2 of lithium ion battery decreases first and then increases, while the cycle performance of lithium ion battery increases first and then decreases.

By comparing Example 1 and 16-21, it is known that as the average particle size of the first inorganic particle in the first coating increases, the average K1 of the lithium ion battery does not change significantly, the average K2 of the lithium ion battery shows an increasing trend, and the cycle performance of lithium ion battery is also gradually increasing.

By comparing Example 1 and 22-25, it is known that as the thickness of the first coating layer increases, the average K1 and K2 of the lithium ion battery exhibit a decreasing tendency, and the cycle performance of the lithium ion battery tends to decrease.

By comparing Example 1 and 26-27, it is known that when the other conditions are the same, the average K1 of the lithium ion battery of the wound type, stacked type, and folded type electrode assembly is not much different, wherein the reduction in the average K2 of the lithium ion battery of the wound type electrode assembly is most pronounced. In addition, the stacked type electrode assembly is most effective in improving the cycle performance of the lithium ion battery.

By comparing Example 1 and 28-30, it is known that the presence of the second coating layer facilitates the reduction of the average K1 and K2 of the lithium ion battery, but the cycle performance of the lithium ion battery may be also reduced.

Those skilled in the art will appreciate that the above-described examples are merely exemplary examples, and various changes, substitutions and changes may be made without departing from the spirit and scope of the present application.

What is claimed is:

1. A separator, comprising:
   a first porous substrate;
   a second porous substrate; and
   a first coating layer including a substance that reversibly intercalates and deintercalates lithium, and a first inorganic particle;
   wherein the first coating layer is disposed between the first porous substrate and the second porous substrate,
   wherein the substance that reversibly intercalates and deintercalates lithium is at least one selected from the group consisting of mesocarbon microbeads, soft carbon, hard carbon, and titanium-niobium oxide,
   wherein the first inorganic particle is an inorganic particle with piezoelectric property, it is selected from one or more of $Pb(Zr,Ti)O_3$(PZT), $Pb_{1-x}La_xZr_{1-y}TiyO_3$ (PLZT), $Pb(Mg_{1/3}Nb_{2/3})O_3$—$PbTiO_3$(PMN-PT) and cerium oxide ($HfO_2$).

2. The separator according to claim 1, wherein the substance that reversibly intercalates and deintercalates lithium is selected from one or more of artificial graphite, natural graphite, mesocarbon microbeads, soft carbon, hard carbon, tin, silicon carbon composites, and titanium-niobium oxide.

3. The separator according to claim 1, wherein the first porous substrate has a thickness of 0.5 µm to 50 µm;
   the second porous substrate has a thickness of 0.5 µm to 50 µm;
   the first coating layer has a thickness of 0.05 µm to 10 µm.

4. The separator according to claim 1, wherein the first coating layer further includes a binder, and the binder is selected from one or more of vinyl fluoride-hexafluoropropylene copolymer, vinylidene fluoride-trichloroethylene copolymer, polystyrene, polyacrylate, polyacrylic acid, polyacrylic acid salt, polyacrylonitrile, polyvinylpyrrolidone, polyvinyl acetate, ethylene-vinyl acetate copolymer, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, carboxymethyl cellulose, sodium carboxymethyl cellulose, lithium carboxymethyl cellulose, acrylonitrile-styrene-butadiene copolymer, polyphthalaldehyde phenyl diamine, polyvinyl alcohol, styrene-butadiene copolymer and polyvinylidene fluoride.

5. The separator according to claim 1, wherein at least one of a surface of the first porous substrate remote from the first coating layer and a surface of the second porous substrate remote from the first coating layer includes a second coating layer, and the second coating layer includes one or both of a second inorganic particle and a polymer.

6. The separator according to claim 1, wherein the first inorganic particle is selected from at least one of a) an inorganic particle having a dielectric constant of 5 or more, and b) an inorganic particle with lithium ion conductivity.

7. The separator according to claim 5, wherein the second inorganic particle is selected from at least one of a) an inorganic particle having a dielectric constant of 5 or more, b) an inorganic particle with piezoelectricity and c) an inorganic particle with lithium ion conductivity.

8. The separator according to claim 6, wherein the inorganic particle having a dielectric constant of 5 or more is selected from one or more of $SrTiO_3$, $SnO_2$, $CeO_2$, MgO, NiO, CaO, ZnO, $ZrO_2$, $Y_2O_3$, $Al_2O_3$, $TiO_2$, boehmite, magnesium hydroxide and SiC.

9. The separator according to claim 6, wherein the inorganic particle with lithium ion conductivity is selected from at least one of:
   lithium phosphate ($Li_3PO_4$);
   lithium aluminum titanium phosphate ($Li_xAl_yTi_z(PO_4)_3$), wherein $0<x<2$, $0<y<1$, $0<z<3$;
   $(LiAlTiP)_xO_y$-type glass, wherein $0<x<4$, $0<y<13$;
   lithium lanthanum titanate ($Li_xLa_yTiO_3$), wherein $0<x<2$, $0<y<3$;
   lithium germanium thiophosphate ($Li_xGe_yP_zS_w$), wherein $0<x<4$, $0<y<1$, $0<z<1$, $0<w<5$;
   $SiS_2$-type glass ($Li_xSi_yS_z$), wherein $0<x<3$, $0<y<2$, $0<z<4$; and
   $P_2S_5$-type glass ($Li_xP_yS_z$), wherein $0<x<3$, $0<y<3$, $0<z<7$.

10. The separator according to claim 1, wherein the first inorganic particle has an average particle diameter (Dv50) of 0.001 µm to 15 µm.

11. The separator according to claim 5, wherein the second inorganic particle has an average particle diameter (Dv50) of 0.001 µm to 15 µm.

12. The separator according to claim 1, wherein the mass ratio of the first inorganic particle to the substance that reversibly intercalates and deintercalates lithium is 0.1 to 16.

13. The separator according to claim 5, wherein the second coating layer includes a second inorganic particle and a polymer, and the weight percentage of the second inorganic particles is from 40% to 99% based on total weight of the second coating layer.

14. The separator according to claim 5, wherein the polymer is selected from one or more of vinyl fluoride-hexafluoropropylene copolymer, vinylidene fluoride-trichloroethylene copolymer, polystyrene, polyacrylate, polyacrylic acid, polyacrylic acid salt, polyacrylonitrile, polyvinylpyrrolidone, polyvinyl acetate, ethylene-vinyl acetate copolymer, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, carboxymethyl cellulose, sodium carboxymethyl cellulose, lithium carboxymethyl cellulose, acrylonitrile-styrene-butadiene copolymer, polyphthalaldehyde phenyl diamine, polyvinyl alcohol, styrene-butadiene copolymer and polyvinylidene fluoride.

15. The separator according to claim 4, wherein the polyacrylate includes one or more of poly (methyl methacrylate), poly (ethyl acrylate), poly (propyl acrylate) and poly (butyl acrylate).

16. The separator according to claim 1, wherein the first porous substrate and the second porous substrate are a polymer film, a multilayer polymer film, or a nonwoven fabric formed by any one or more of polyethylene, polypropylene, polyethylene terephthalate, polyphthalaldehyde phenyl diamine, polybutylene terephthalate, polyester, polyacetal, polyamide, polycarbonate, polyimide, polyetheretherketone, polyaryletherketone, polyetherimide, polyamideimide, polybenzimidazole, polyethersulfone, polyphenylene ether, cyclic olefin copolymer, polyphenylene sulfide and polyethylene naphthalene, wherein the polyethylene is selected from at least one component of high-density polyethylene, low-density polyethylene, and ultra-high-molecular-weight polyethylene.

17. The separator according to claim 1, wherein the first porous substrate and the second porous substrate have an average pore diameter of 0.001 μm to 10 μm and the first porous substrate and the second porous substrate have a porosity of 5% to 95%.

18. An electrochemical device, comprising:
a positive electrode;
a negative electrode; and
a separator comprising:
a first porous substrate;
a second porous substrate; and
a first coating layer including a substance that reversibly intercalates and deintercalates lithium, and a first inorganic particle;
wherein the first coating layer is disposed between the first porous substrate and the second porous substrate,
wherein the substance that reversibly intercalates and deintercalates lithium is at least one selected from the group consisting of mesocarbon microbeads, soft carbon, hard carbon, and titanium-niobium oxide, and
wherein the first inorganic particle is an inorganic particle with piezoelectric property, it is selected from one or more of $Pb(Zr,Ti)O_3$(PZT), $Pb_{1-x}La_xZr_{1-y}Ti_yO_3$ (PLZT), $Pb(Mg_{1/3}Nb_{2/3})O_3$—$PbTiO_3$(PMN-PT) and cerium oxide ($HfO_2$).

19. The electrochemical device according to claim 18, wherein the electrochemical device is a lithium ion battery and the lithium ion battery includes an electrode assembly, the electrode assembly being of a wound type.

* * * * *